H. H. EAMES & C. J. EAMES.
Apparatus for Treating Ores, Sulpnurets, Animal Matter, Paints, &c.
No. 139,664. Patented June 10, 1873.
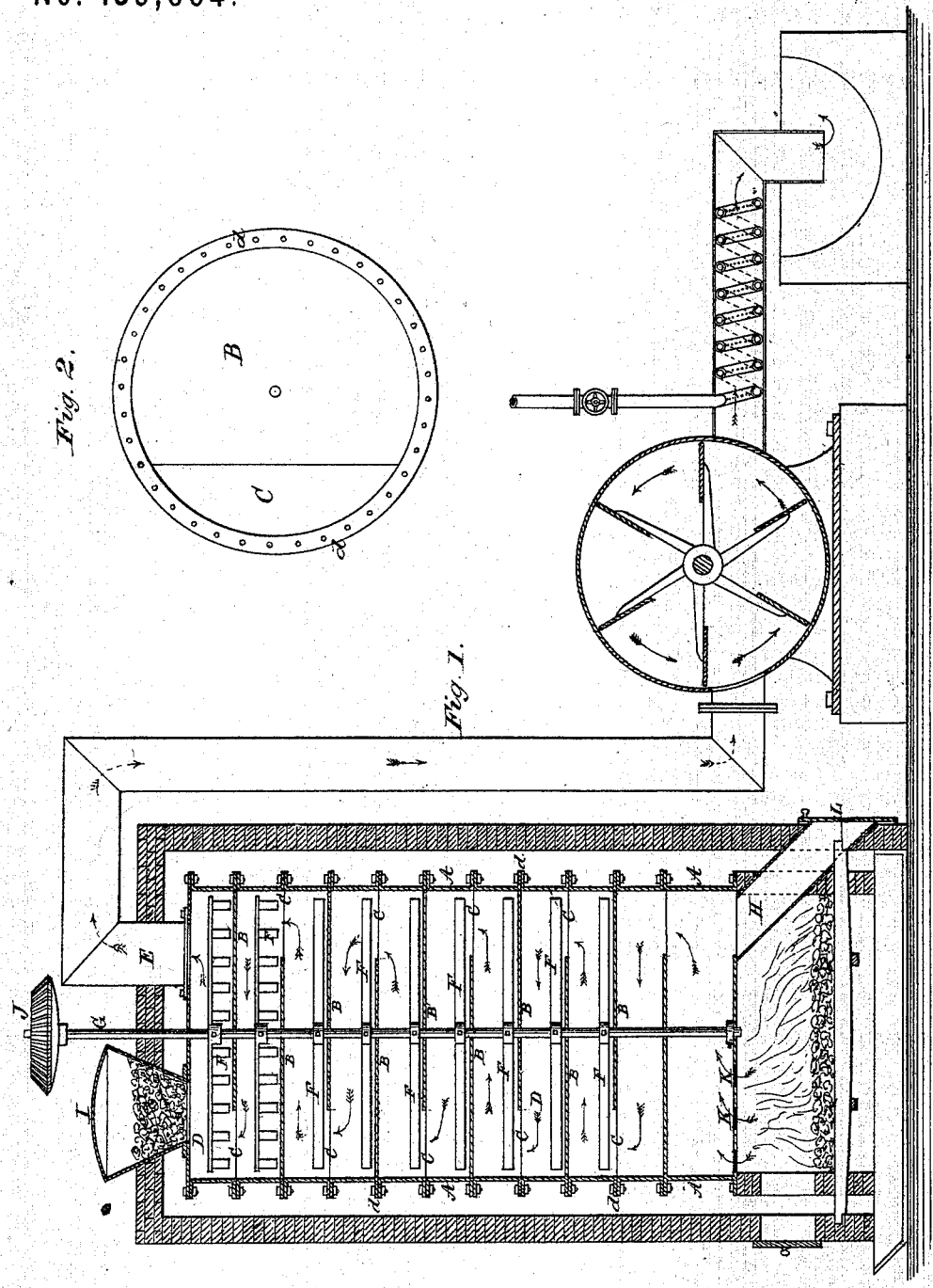
Witnesses:
Inventors:

UNITED STATES PATENT OFFICE.

HENRY H. EAMES AND CHARLES J. EAMES, OF NEW YORK, N. Y.

IMPROVEMENT IN APPARATUS FOR TREATING ORES, SULPHURETS, ANIMAL MATTER, PAINTS, &c.

Specification forming part of Letters Patent No. 139,664, dated June 10, 1873; application filed May 31, 1873.

*To all whom it may concern:*

Be it known that we, HENRY H. EAMES and CHARLES J. EAMES, of New York, in the county of New York, in the State of New York, have invented a new and Improved Apparatus for Treating Sulphureted Ores, Animal Matter, White Lead, and other substances; and we do hereby declare that the following is a full and exact description thereof, reference being had to the accompanying drawings.

The nature of our invention consists in the construction of an apparatus that will completely eliminate the sulphur from sulphureted ores, the whole of the moisture remaining in animal matter after rendering or boiling, as well as thoroughly dry white lead or any precipitated pigment, and other material. The object of our invention is to treat in a thoroughly perfect and economical manner all sulphureted ores, offensive animal matter, white lead, and any precipitated pigment or other material, preventing at same time the noxious gases from arising by subjecting a continuous stream of the material to be treated in thin stratums upon descending alternate diaphragms with an ascending current of heated air or superheated steam, condensing the matter eliminated in any suitable manner.

We have found that when large bodies of sulphureted ores, animal matter, offal, blood, &c., and also when large masses of any precipitated pigment, such as white lead, umber, indigo, and all well-known precipitated water-colors are treated in bulk, much time is consumed in thoroughly eliminating the substances contained in the ores and other material mentioned, owing to their compactness, which prevents the heated air from coming in contact with all parts, and in the case of offal the gelatinous matter becomes partly melted and will not part with its moisture.

Figure 1 is a vertical section of an apparatus embodying our invention. Fig. 2 is a detail view of a part of the same.

A A are cylinders made of metal, and may be of oblong or other than circular form, provived with metal plates or diaphragms B, and flanges $d$. (See Fig. 2.) These cylinders A are firmly bolted together, one above the other, by their flanges $d$, with a cement packing between said flanges, so as to form a vapor-tight chamber, divided into a series of compartments, D, communicating with one another through openings C in diaphragms B, which are placed four inches (more or less) apart, and form the partitions between compartments D, as clearly illustrated in Fig. 1. The diaphragms B may be bolted on the inside of a cylinder formed of one piece, instead of the series of cylinders A, and thus form the desired vapor-tight chamber. As to diaphragms B, or compartments D, they may be varied in number and size to suit the nature and quantity of the material to be treated. E is the pipe to convey the vapor eliminated from the material to any suitable condenser. F F are blades or stirrers made of iron. The first two or three are formed with teeth or prongs to break up the mass of material when it first enters the apparatus. G is the shaft running through the center of the machine from top to the bottom, provided with a collar firmly secured at bottom end of said shaft to serve as a bearing on which it revolves, and also carries the blades or stirrers F F, which are firmly fastened on said shaft, and revolve the blades in each compartment, thus removing the material from one plate to the other until it reaches the bottom or discharge-pipe. H is the discharge-pipe or outlet for the treated material, and is formed of brick or iron and furnished with a valve or sliding door. $j$ is the hopper wherein the material is passed into the apparatus. J is a spur-wheel fitted firmly on the shaft G to revolve the same. K K are openings in bottom plate to allow the products of combustion or heated air to pass up into the apparatus in contact with the material to be treated. In place of the openings K K we sometimes use a steam-coil placed in the fire under the machine, and when this is used we close openings K K and admit superheated steam into the bottom of the machine and surround the outside of the machine with the products of combustion of the fire below. This is the case when white lead or other pigments are to be treated, and direct contact of the products of combustion of the fire would prove detrimental to the pigments We sometimes use heated air forced into the apparatus by means of a common blower or fan in the same manner as the superheated steam passes into the machine, and at others use a blower or fan to urge the fire under the machine, and so force the products of combustion up through the apparatus at openings K K; in this case the fire-door and ash-pit are securely closed.

We have found that it is desirable at times to use a blower or fan-exhaust attached to pipe E, and in this manner draw up through the apparatus the products of combustion of the fire below the machine, and in either case named cause a spray of finely-divided water to condense the vapors generated in the apparatus, thus preventing sulphurous fumes and noxious gases from permeating the surrounding atmosphere.

L is a sliding door or valve at ends of outlet or discharge-pipe H to prevent the heated gases passing out at bottom, and is closed until sufficient quantity of the material has passed down through the apparatus, when it is partially opened to allow the material to pass out.

In all cases we construct of brick or other material a furnace, in which the apparatus above described is surrounded and firmly supported inside the furnace by means of a base of brick or iron inclosing the fire-space on which the machine rests, and also serves as a flue to surround the outside of the apparatus, on top of which a chimney is placed to carry off the products of combustion when they are not passed into the inside of the apparatus, which is the case when ores and pigments are treated.

The operation of our apparatus, when constructed substantially as above described, is as follows:

A fire is started in the furnace, and when the apparatus has become sufficiently heated the shaft G is set in motion, and the material to be treated is fed into the hopper I, passing down into the upper compartment D, and from said compartment D falls upon the heated diaphragm B of that compartment, through the opening C in said diaphragm into the compartment next below, and so on down from the upper compartment to the lowest, thence into discharge-pipe H, and passing out of the apparatus at valve L, the valve or door L being closed at first, and is not opened until the heated material has passed down, when it is made sufficiently wide to allow the materials to pass out as finished. A brisk fire is kept up, and the products of combustion pass through openings K K, thence up through the opening C of diaphragms B, through the series of compartments D, where the material to be treated is steadily passing down in diffused stratums, and in an opposite direction to the ascending heated air or products of combustion, completely eliminating the substances contained in the material being treated. The outlet-pipe E, when connected with an exhaust, carries off the vapor or moisture to a condenser, and also draws through the inside of the apparatus the products of combustion; and, again, when superheated steam is used this pipe E performs the same function, as is also the case when a blower or fan is used under the fire beneath the apparatus. The said pipe E is sometimes connected to a chimney, and in this manner carries off the vapor or moisture from the apparatus arising from the material during its treatment.

Having thus fully described our invention, what we claim as new, and desire to secure by Letters Patent, is—

1. The apparatus herein described for treating ores, animal matter, white lead, and other precipitated pigments, the same consisting of an outward vertical case, having within it a series of shelves and rakes or stirrers, so as to agitate the material and move it from the upper to the lower shelves, as and for the purpose set forth.

2. The combination of the vertical case, having alternate shelves and stirrers, with the exhaust-fan and condensing apparatus.

3. The combination of the furnace arranged so as to inclose the treating-case, and transmit the products of combustion through it, with the draft or blast apparatus, and the condensing apparatus, all substantially as specified.

HENRY H. EAMES.
CHARLES J. EAMES.

Witnesses:
THOS. HINWOOD,
JOHN NORWOOD.